United States Patent [19]
Morse

[11] 3,794,089
[45] Feb. 26, 1974

[54] POSITIONING COUPLING FOR A TABLE BRACKET

[76] Inventor: Glenn B. Morse, 321 Fountain N. E., Grand Rapids, Mich. 49503

[22] Filed: Aug. 28, 1972

[21] Appl. No.: 284,417

[52] U.S. Cl. .............. 144/1 C, 83/477.1, 83/477.2, 83/698, 144/35 R, 90/17, 287/14, 408/20
[51] Int. Cl. .............................................. B27c 9/02
[58] Field of Search .. 287/14; 83/477, 477.1, 477.2, 83/478, 698; 144/1 R, 1 C, 1 G, 1 D, 1 H, 1 J, 35 R, 35 A; 90/17; 408/234, 236, 20; 29/568

[56] References Cited
UNITED STATES PATENTS
| | | | |
|---|---|---|---|
| 3,709,622 | 1/1973 | Morse | 144/1 C X |
| 2,963,057 | 12/1960 | Morse | 144/1 C |
| 2,623,269 | 12/1952 | Goldschmidt | 144/1 C |
| 2,835,289 | 5/1958 | Rockwell | 144/1 C |

FOREIGN PATENTS OR APPLICATIONS
| | | | |
|---|---|---|---|
| 1,127,608 | 9/1968 | Great Britain | 287/14 |

Primary Examiner—Andrew R. Juhasz
Assistant Examiner—W. D. Bray

[57] ABSTRACT

A machine having a cylindrical beam and a support capable of placing the beam horizontally, and rotatably adjustable in this position, is provided with a coupling interengaging a table bracket with the support to lock the bracket against rotation about the axis of the beam. The beam is itself rotatably adjustable with respect to the support about the beam axis. The coupling permits the bracket to be locked in a selected position while the beam is angularly adjusted about its own axis for various purposes.

3 Claims, 7 Drawing Figures

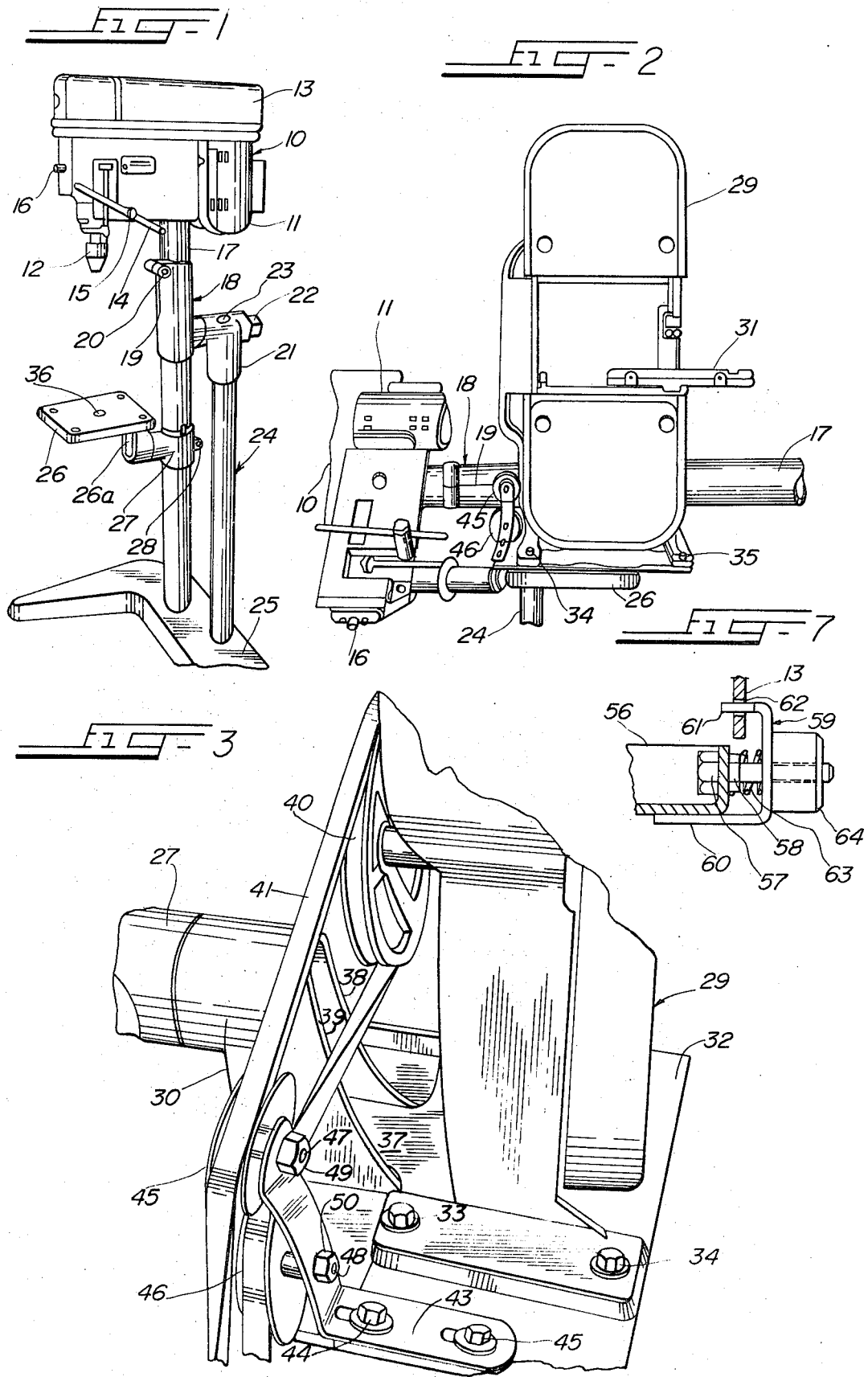

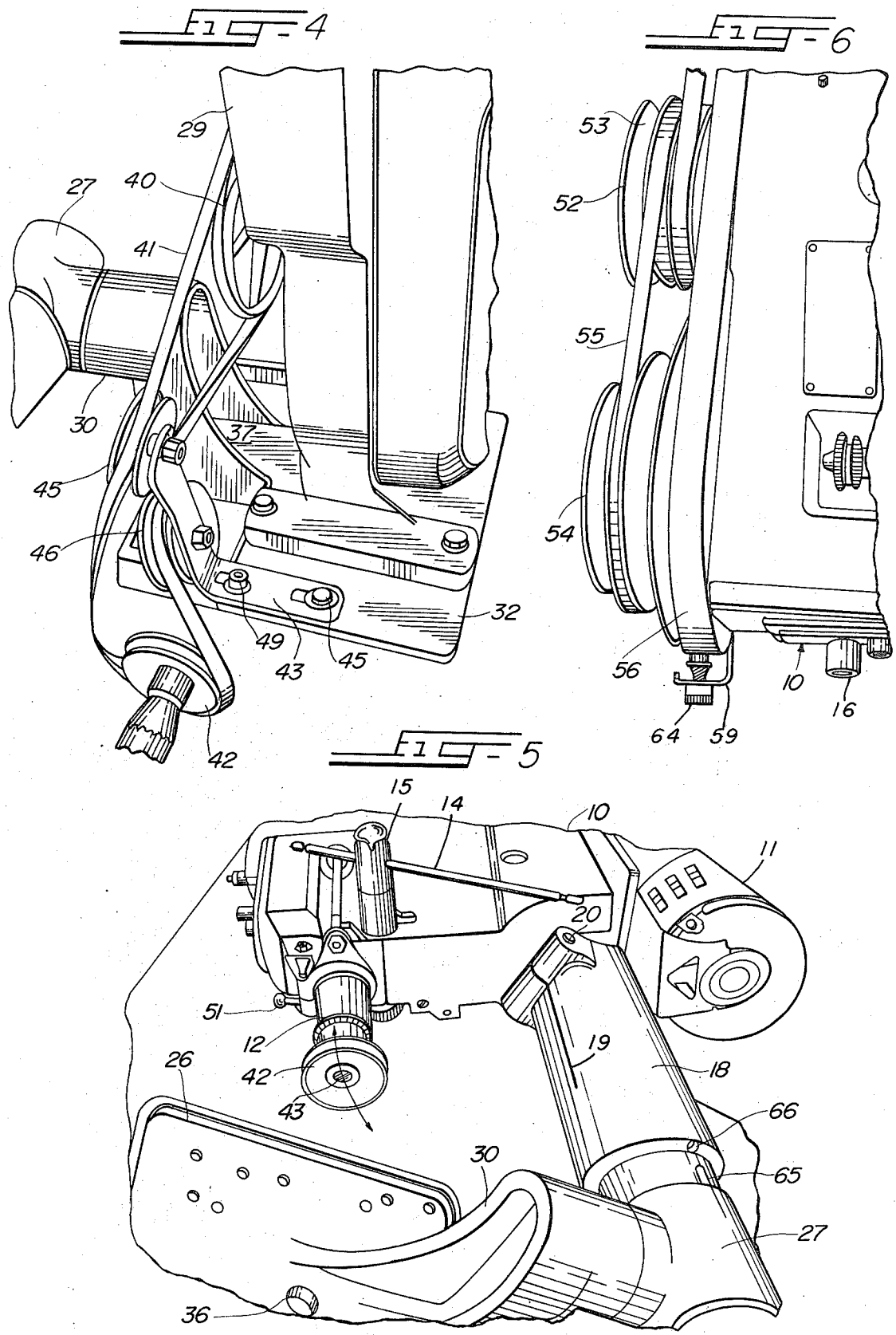

POSITIONING COUPLING FOR A TABLE BRACKET

BACKGROUND OF THE INVENTION

Experience has shown that a multiple purpose machine of the type shown in U. S. Pat. No. 2,963,057 can be used as a base for a practically endless series of attachments by supporting the attachments on the table of the machine and driving them with a belt sheave held in the chuck of the machine's power head. Without the attachments, the machine is essentially a drill press, with a pivoted stand capable of placing the beam carrying the power head in various positions between vertical and horizontal. The table of the drill press is mounted on the usual table bracket, which is slidable along this beam in the usual manner associated with the column of the floor model drill press. When the base machine is placed in the horizontal position, and the table surface is also placed in a horizontal position by appropriate adjustment, the power head (together with the column) can be rotated about its own axis while the table is held horizontal, thus providing an excellent form of belt-tensioning accommodation, and also permitting the most convenient form of installation and removal of the belt that can be imagined.

The difficulty encountered with using a machine of a type shown in U. S. Pat. No 2,963,057 for this type of belt adjustment has centered in the maintenance of the position of the table so that the power head could be rotated about the beam axis without correspondingly rotating the table. What is really desirable is a rotation of the power head with respect to the table, while the table remains horizontal. The problem deals not only with convenience, but with safety. An attachment of substantial weight placed on the table will cause a serious danger if all of the clamping system is relaxed to a degree necessary to affect an angular adjustment about the beam axis between the table and the power head.

SUMMARY OF THE INVENTION

A machine of a type shown in U. S. Pat. 2,963,057 is provided with a coupling preferably axially interengaging the table bracket with the structure supporting the cylindrical column beam carrying the power head. This coupling is adapted to place the table surface in horizontal position, so that the column beam can be rotated with respect to the table, thus permitting the power head to swing downward without affecting the position of the table. When the clamping arrangements securing the adjusted position of the column to the support structure, and the table bracket to the column, are tightened, the entire assembly becomes a secure structure. The clamping systems can be relaxed to provide for further adjustment or for disengagement and removal of the belt without generating a risk of dropping the table and any attachments that happen to be mounted on it.

DESCRIPTION OF THE DRAWINGS

FIG. 1 is a perspective view of the machine positioned with the power head in the vertical position preparatory to functioning as an ordinary drill press.

FIG. 2 is a front view in perspective showing the machine illustrated in FIG. 1 with the power head in the horizontal position, and with the table supporting a conventional band saw.

FIG. 3 is a perspective view on an enlarged scale of the belt drive associating the band saw shown in FIG. 2 with the power head of the machine.

FIG. 4 is a perspective view similar to FIG. 3, showing a position of the power head spindle appropriate for installation or removal of the belt, with the belt in a relaxed condition.

FIG. 5 is a perspective view showing the manner in which a driving sheave is held in position for receiving a belt, and illustrating the manner in which rotation of the power head about the column beam axis produces a movement of the driving sheave with respect to the table.

FIG. 6 is a view of the conventional belt system in the power head of the drill press, and the latch mechanism used for holding the hood covering this mechanism in the closed position.

FIG. 7 is a section on a vertical plane showing the hood latch on an enlarged scale.

DESCRIPTION OF THE PREFERRED EMBODIMENT

The machine shown in FIG. 1 is equipped with a power head generally indicated at 10, which is the same as that associated with an ordinary drill press. The motor 11 drives a spindle carrying the chuck 12 through a power transfer system concealed beneath the hood 13. The handle 14 rotates the shaft 15 to advance the spindle in a downward direction, all of which is standard drill press construction. The controls of the machine are normally in the form of push buttons as indicated at 16, which are electrically connected through concealed wiring to control the motor 11.

The power head assembly 10 is clamped rigidly to the cylindrical column beam 17 by conventional arrangements (not shown). This beam is rotatable within the front pivot member 18, which is slotted over a part of its length at 19 to provide a small degree of peripheral resilience so that the clamping bolt 20 can be tightened to constrict the member 18 about the beam 17 and secure the beam angularly and axially with respect to the support structure. The member 18 has a pivot shaft (not shown) extending through the the rear pivot member 21, and secured in position by the nut 22. The latter can be tightened to determine the degree of resistance to rotation of the front pivot member 18 with respect to the rear pivot member 21. A set screw 23 is in threaded engagement with the rear pivot member 21, and extends into engagement with the pivot shaft to lock the adjusted position of the front pivot member at a selected position between vertical and horizontal. The rear pivot member is fixed with respect to the rear column 24, which is also fixed with respect to the "U"-shaped based 25.

The table 26 is rotatably connected to the table bracket 27, which is slidable axially on the beam 17, and is also rotatable with respect to the beam 17. The rotatable mounting of the table to the bracket is provided by a suitable bolt to the table bracket with the bolt thus determining the axis of rotatable adjustment of a table with respect to the bracket. The selected position of the table bracket with respect to the beam is established by tightening the clamping bolt 28, which constricts the table bracket about the beam.

When the power head (and the column beam 17) are swung into the horizontal position shown on FIG. 2, and the table 26 positioned as shown (with the table swung downward), the underside of the table (with respect to the position shown in FIG. 1) becomes a solid shelf on which attachments may be placed for receiving power from the power head 10 with suitable belt power-transfer systems. FIG. 2 illustrates the placement of a conventional band saw 29 in such a position. The offset arm 30 of the table establishes two different heights for the table (accompanied by a 180° rotation between these positions), and the lower table position shown in FIG. 2 is particularly appropriate for attachments similar to the band saw 29 which have substantial height. The selection between the two vertically-spaced positions of the table can be made on the basis of placing the working surface 31 of the band saw at the best level for the operator.

A convenient arrangement for mounting the band saw 29 on the table 26 involves the securing of the band saw directly to a plate 32 with bolts as shown at 33–35, together with a securing of the plate to the table with a bolt traversing the central table hole 36 shown best at FIG. 5. This hole is normally provided in a drill press table for drilling clearance. In addition to the bolt through the hole 36, the plate 32 has a tongue 37 that slips easily between the flanges 38 and 39 of the offset arm 30, so that the tongue can be used as a means of orienting the position of the band saw as is placed on the table. With the tongue engagement, as shown in FIG. 3, the passage of a bolt through the plate 32 and the table hole 36 will complete the securing of the band saw.

Power is supplied to the band saw sheave 40 through the belt 41 from the driving sheave 42 mounted on the stub shaft 43 held in the chuck 12 of a power head. Due to the transverse relationship of the planes of rotation of the sheaves 40 and 42, a system of idler sheaves has to be used to establish the proper course of the belt 41. A bracket 43 is adjustably secured to the plate 32 by the bolts 44 and 45, which engage elongated holes in the bracket 43 to permit an adjustment in the placement of the bracket 43 in the left-right direction, as viewed in FIG. 4. The idler sheaves 45 and 46 are respectively mounted on stub shafts 47 and 48 secured by the nuts 49 and 50 to the bracket 43. The bracket 43 is bent to the illustrated configuration so as to place the idler sheaves 45 and 46 appropriately to receive the various runs of the belt 41 as it engages the sheaves 40 and 42.

The installation of the belt 41 is accomplished most easily when the power head is swung upward about the axis of the beam 17 to produce a slack condition of the belt, as shown in FIG. 4. This adjustment is made by loosening the clamping bolt 20, which permits the rotation of the beam 17 with respect to the front pivot member 18. It is very significant here that the standard feed adjustment of the drill press controlled by the handle 14 is used in the present arrangement as a means of properly placing the plane of rotation of the sheave 42 to receive the belt 41 as it leaves the idlers 45 and 46. This adjustment is then locked by the quill clamp handle 51 associated with conventional drill press construction. The rotation of the entire power head with respect to the front pivot member 18 produces a path of movement of the sheave 42 in the direction of the arcuate arrow shown in FIG. 5. When swung upward, the resulting position shown in FIG. 4 permits the belt 41 to be slipped on or off with utmost ease. When the belt is in position, gentle downward pressure on the frontal area of the power head will swing the sheave 42 downward along its arcuate path to a point corresponding to the desired belt tension, at which the clamp bolt 20 can be tightened to retain the adjustment. It should be noted in passing that the installation of the belt 41 requires a 180° twist applied in a counterclockwise direction to the lower course of the belt as it leaves the pulley 40, and before it is placed in engagement with the lower idler sheave 46. Twists of approximately 90° in the illustrated directions are also applied to the courses of the belt 41 between the lower sheave 46 and the drive sheave 42, and between the drive sheave 42 and the upper idler 45.

One of the factors that make the basic machine shown in FIG. 1 so attractive for the powering of a variety of attachments is the conventional power transmission normally concealed beneath the hood 13. In one conventional form of belt transmission, the motor 11 is arranged to drive a central multiple-step idler 52 with the belt 53, with the idler driving the multiple-step sheave 54 with the belt 55. It is customary to provide a multiple-step sheave on the motor also, which thus gives a double range of relative speed of rotation. A machine using a standard motor adapted to run at approximately 1,725 r.p.m. can be used to drive a wide range of equipment, which may require very low speed operation, as well as equipment requiring very high speed. Without further adaptation, a machine of the type illustrated in these drawings can be used to operate a band saw at speeds appropriate for cutting metal, and also the much higher speeds appropriate for cutting wood, merely by by an adjustment of the belts 53 and 55.

In view of the horizontal position of the device, it is preferable to use a positive latch arrangement for securing the hood in position in order to obtain its full benefits as a belt guard around high speed belt systems. The hood latch is best shown in FIG. 7. The flanged plate 56 is conventional on drill press construction, and is closely surrounded by the hood 13 when the hood is in the closed position shown in FIG. 1. The hood latch is mounted on the bolt 57 traversing the peripheral flange of the plate 56, which is held between the head of the bolt 57 and the thin nut 58. A U-shaped clip 59 has its lower leg 60 bearing on the underside of the plate 56, with opposite leg in the form of a tongue 61 engageable with an appropriate hole 62 in the hood 13. A cone spring 63 biases the clip 59 to the right, as shown in FIG. 7, against the action of the nut 64. The diameter of the base of the cone spring should be selected to exceed that of the nut 58. Loosening or tightening the nut 64 will engage or disengage the tongue 61 from the hole 62, and thus lock or release the hood. On release, the hood swings to the rear about a conventional hinge arrangement adjacent the motor 10.

It is obvious that the placement of an attachment of substantial size on the table 26, as shown on FIG. 2, will result in a very strong tendency to swing the table downward about the column beam 17. This, of course, can be counteracted by appropriate tightening of both the clamp bolts 20 and 28. The manipulation of these in conjunction with the appropriate setting of belt tension, while retaining the desired upright position of the band saw 29, is an extremly difficult maneuver. This problem is eliminated entirely by the arrangement shown in FIG. 5. The table bracket 27 is provided with a fixed pin 65 located appropriately for engagement with the socket 66 in the end of the front pivot member 18. The axial sliding of the table bracket 27 toward the pivot member, accompanied by appropriate rotational placement, will produce a condition in which the pin 65 can interengage with the socket 66. At this point, it is obvious that the table bracket is restrained against movement about the axis of the beam 17, while the beam is still free to rotate (with the power head) when the clamping bolt 20 is released. Interengagement of this coupling prior to placement of the band saw 29 will result in removal of the problem and danger previously described. A caution should be observed, however, against any attempt to move the entire beam assembly to the right, as shown in FIG. 2, with respect to the front pivot member 18. This could be accomplished when the clamp bolt 20 was loosened, whether or or not the bolt 28 was tightened. Any such movement would obviously disengage the coupling pin 65, and produce a dangerous condition.

I claim:

1. A machine having a cylindrical beam and support means for said beam adapted to position said beam substantially horizontally, said beam being adjustable about the axis thereof with respect to said support means, said machine also having a power head, a table bracket slideable axially on said beam and rotatable thereon, and a table mounted on said bracket for angular adjustment about a mounting axis substantially perpendicular to the axis of said beam, said table having at least one supporting surface substantially parallel to said mounting axis, wherein the improvement comprises:

coupling means on said table bracket and support means, said coupling means being operative to lock said bracket against rotation with respect to said support means about the axis of said beam.

2. A machine as defined in claim 1, wherein said coupling means is interengageable axially with respect to said beam.

3. A machine as defined in claim 2, wherein said coupling means is a pin on one of said bracket and said support means, and means forming a socket on the other of said bracket and said support means.

* * * * *